US008815200B2

(12) United States Patent
Landry et al.

(10) Patent No.: US 8,815,200 B2
(45) Date of Patent: Aug. 26, 2014

(54) MESOPOROUS INORGANIC OXIDE SPHERES AND METHOD OF MAKING SAME

(75) Inventors: Christopher C. Landry, Burlington, VT (US); Terry W. Nassivera, Colchester, VT (US)

(73) Assignee: The University of Vermont and State Agricultural College, Burlington, VT (US)

( * ) Notice: Subject to any disclaimer, the term of this patent is extended or adjusted under 35 U.S.C. 154(b) by 1355 days.

(21) Appl. No.: 11/292,178

(22) Filed: Dec. 1, 2005

(65) Prior Publication Data

US 2006/0118490 A1    Jun. 8, 2006

Related U.S. Application Data

(60) Provisional application No. 60/632,830, filed on Dec. 2, 2004.

(51) Int. Cl.
| | |
|---|---|
| *C01B 33/12* | (2006.01) |
| *B01J 20/28* | (2006.01) |
| *B01J 20/10* | (2006.01) |
| *B01J 20/283* | (2006.01) |
| *C01B 37/02* | (2006.01) |

(52) U.S. Cl.
CPC .......... *C01B 37/02* (2013.01); *B01J 20/28083* (2013.01); *B01J 20/28057* (2013.01); *B01J 20/103* (2013.01); *C01B 33/12* (2013.01); *B01J 20/283* (2013.01); *B01J 20/28019* (2013.01); *B01J 20/28076* (2013.01)
USPC ....................................................... 423/335

(58) Field of Classification Search
USPC ..................................................... 423/335
See application file for complete search history.

(56) References Cited

U.S. PATENT DOCUMENTS

| | | | | |
|---|---|---|---|---|
| 4,554,211 | A | 11/1985 | Arika et al. | 428/402 |
| 5,068,216 | A | 11/1991 | Johnson et al. | 502/241 |
| 5,112,589 | A | 5/1992 | Johnson et al. | 423/328 |
| 5,143,887 | A | 9/1992 | Hung et al. | |
| 5,156,828 | A | 10/1992 | Degnan et al. | 423/709 |

(Continued)

FOREIGN PATENT DOCUMENTS

| | | | | |
|---|---|---|---|---|
| GB | 2269377 | | 2/1994 | 423/338 |
| WO | 97/32815 | | 9/1997 | 423/338 |
| WO | 9937705 | | 7/1999 | |

OTHER PUBLICATIONS

Boissiere et al., "A New Synthesis of Mesoporous MSU-X Silica Controlled by a Two-Step Pathway." Chem. Mater. 2000, 12, 2902-2913.*

(Continued)

*Primary Examiner* — Paul Wartalowicz
(74) *Attorney, Agent, or Firm* — Wolf, Greenfield & Sacks, P.C.

(57) ABSTRACT

A method of preparing mesoporous inorganic oxide spherical particles includes providing a reaction mixture capable of producing mesoporous inorganic oxide spheres; heating the reaction mixture to produce mesostructured inorganic oxide particles and removing organic material from the mesostructured inorganic oxide particles to form the mesoporous inorganic oxide spherical particles. In one embodiment a reaction mixture includes a proton donor, a source of inorganic oxide, and a source of fluoride. In another embodiment a reaction mixture includes a proton donor, a source of inorganic oxide, and an alcohol. Mesoporous inorganic oxide spheres produced by the method of the present invention are also provided.

23 Claims, 11 Drawing Sheets

(56) References Cited

U.S. PATENT DOCUMENTS

| | | | | |
|---|---|---|---|---|
| 5,220,101 | A | 6/1993 | Beck et al. | 585/824 |
| 5,264,197 | A | 11/1993 | Wang et al. | 423/338 |
| 5,308,602 | A | 5/1994 | Calabro et al. | 423/705 |
| 5,378,440 | A | 1/1995 | Herbst et al. | 423/210 |
| 5,840,264 | A | 11/1998 | Pinnavaia et al. | 423/277 |
| 5,858,457 | A | 1/1999 | Brinker et al. | 427/162 |
| 5,958,577 | A | 9/1999 | Sugimoto | 423/338 |
| 6,096,469 | A * | 8/2000 | Anderson et al. | 427/256 |
| 6,326,326 | B1 | 12/2001 | Feng et al. | 502/62 |
| 6,334,988 | B1 | 1/2002 | Gallis et al. | 423/326 |
| 6,630,170 | B2 | 10/2003 | Balkus, Jr. et al. | 424/489 |
| 6,902,806 | B2 | 6/2005 | Fujiwara et al. | 428/402 |
| 6,946,109 | B2 | 9/2005 | Pinnavaia et al. | 423/335 |
| 2002/0197206 | A1* | 12/2002 | Balkus et al. | 423/702 |
| 2003/0095908 | A1* | 5/2003 | Pinnavaia et al. | 423/335 |
| 2004/0106178 | A1 | 6/2004 | Ackerman et al. | 435/182 |
| 2005/0107624 | A1 | 5/2005 | Lin et al. | 554/174 |
| 2005/0133050 | A1 | 6/2005 | Fournier et al. | 131/207 |

OTHER PUBLICATIONS

"Oil-Water Interface Templating of Mesoporous Macroscale Structures," by S. Schacht et al., Science, vol. 273, pp. 768-771, Aug. 9, 1996.

"Mesostructure Design with Gemini Surfacants: Supercage Formation in a Three-Dimensional Hexagonal Array," by Q. Huo et al., Science, vol. 268, pp. 1324-1327, Jun. 2, 1995.

"Ordered mesoporous molecular sieves synthesized by a liquid-crystal template mechanism," by C.T. Kresge et al., Nautre, vol. 359, pp. 710-712, Oct. 22, 1992.

"Aerosol-assisted self-assembly of mesostructure spherical nanoparticles," by Yunfeng Lu et al., Nature, vol. 398, pp. 223-226, Mar. 18, 1999.

"Micrometer-Sized Mesoporous Silica Spheres Grown under Static Conditions," by Limin Qi et al., Chem. Mater., vol. 10, No. 6, pp. 1623-1626, 1998.

"A Novel Pathway Toward MCM-41 Related Mesoporous Monodisperse Silica Spheres in the Submicrometer abd Micrometere Range," by M. Grun and K. K. Unger, $12^{th}$ International Zeolite Conference, pp. 757-761, 1999. (No month).

"Novel Synthesis of Spherical MCM-48," by K. Schumacher et al., Elsevier Science B. B., Microporous and Mesoporous Materials, vol. 27, pp. 201-206, 1999.

"Preparation of Hard Mesoporous Silica Spheres," by Qisheng Huo et al., Chem. Mater., vol. 9, No. 1, pp. 14-17, 1997.

"Synthesis of Mesoporous Silica Spheres Under Quiescent Aqueous Acidic Conditions," by Hong Yang et al., J. Mater. Chem., vol. 8, pp. 743-750, Mar. 1998.

"The Synthesis of Micrometer- and Submicrometer-Size Spheres of Ordered Mesoporous Oxide MCM-41," by Michael Gruin et al., Advanced Materials. vol. 9, No. 3, pp. 254-257, 1997.

Zhao et al, "Nonionic Triblock and Star Diblock . . . Mesoporous Silica Structures", J. Am. Chem. Soc., 120, pp. 6024-6036, 1998.

Huo et al, "Surfactant control of Phases . . . Mesoporous Silica-based Materials", Chem. Mater., 8, 1147-1160, 1996.

Gallis et al, Synthesis of MCM-48 by a Phas Transformation process, Chem. Mater., 9, 2035-2038, 1997.

"Spherical MSU-1 Mesoporous Silica Particles Tuned for HPLC," Boissiere, C.; Kummel, M.; Persin, M.; Larbot; A.; Prouzet, E. *Adv. Funct. Mater.* 2001, 11, 129-134.

"Counterion Effect in Acid Synthesis of Mesoporous Silica Materials", Lin, H.-P.; Kao, C.P.; Mou, C.-Y..; Liu, S.-B. *J Phys. Chem. B.* 2000, 104, 7885-7894.

"Adsorption of Gases in Multimolecular Layers", S. Brunauer et al. in the *Journal of the American Chemical Society*, 1938, vol. 60, pp. 309-319.

"The Determination of Pore Volume and Area Distributions in Porous Substances", Barrett, Joyner, and Halenda *J. Am. Chem. Soc.* 1951, 73, 373-380.

"Application of Large Pore MCM-41 Molecular Sieves . . . Using Nitrogen Adsorption Measurements", Kruk, M.; Jaroniec, M.; Sayari, A. *Langmuir* 1997, 13, 6267-6273.

Blin et al., Mechanism of self-assembly in the synthesis of silica mesoporous materials: in situ studies by X-ray and neutron scattering. Chem Soc Rev. May 7, 2013;42(9):4071-82.

Gorrepati et al., Silica precipitation in acidic solutions: mechanism, pH effect, and salt effect. Langmuir. Jul. 6, 2010;26(13):10467-74.

Manet et al., Kinetics of the formation of 2D-hexagonal silica nanostructured materials by nonionic block copolymer templating in solution. J Phys Chem B. Oct. 6, 2011;115(39):11330-44.

Sundblom et al., Modeling in Situ Small-Angle X-ray Scattering Measurements Following the Formation of Mesostructured Silica. J. Phys. Chem. C. 2009; 113(18):7706-7713.

* cited by examiner

FIG. 5

| TEOS (mol %) | 0.0660 | 1.63 | 0.330 | 1.15 | 0.618 | 0.659 |
|---|---|---|---|---|---|---|
| Sample | TWN3-119 | TWN3-129 | TWN3-150 | TWN3-151 | TWN4-146A | TWN3-15B |
| $H_2O$ (g) | 39.64 | 39.64 | 39.64 | 39.64 | 45.19 | 39.64 |
| EtOH (g) | 11.10 | 11.10 | 11.10 | 11.10 | 5.55 | 11.1 |
| 0.5 Molar NaF solution (g) | 4.76 | 4.76 | 4.76 | 4.76 | 4.76 | 4.76 |
| TEOS (g) | 0.40 | 10.00 | 2.00 | 7.00 | 4.00 | 4 |
| HCl (g) | 4.40 | 4.40 | 4.40 | 4.40 | 4.40 | 4.4 |
| CTAB (g) | 1.80 | 1.80 | 1.80 | 1.80 | 1.80 | 1.8 |
| | | | | | | |
| $H_2O$ (mol) | 2.4688 | 2.4688 | 2.4688 | 2.4688 | 2.7769 | 2.4688 |
| EtOH (mol) | 0.2409 | 0.2409 | 0.2409 | 0.2409 | 0.1205 | 0.2409 |
| NaF (mol) | 0.0024 | 0.0024 | 0.0024 | 0.0024 | 0.0024 | 0.0024 |
| TEOS (mol) | 0.0019 | 0.0470 | 0.0094 | 0.0329 | 0.0188 | 0.0188 |
| HCl (mol) | 0.0449 | 0.0449 | 0.0449 | 0.0449 | 0.0449 | 0.0449 |
| CTAB (mol) | 0.0049 | 0.0049 | 0.0049 | 0.0049 | 0.0049 | 0.0049 |
| | | | | | | |
| $H_2O$ (mol%) | 86.9411 | 85.5801 | 86.7113 | 86.0008 | 91.2197 | 86.4257 |
| EtOH (mol%) | 8.4851 | 8.3523 | 8.4627 | 8.3933 | 3.9575 | 8.4348 |
| NaF (mol%) | 0.0838 | 0.0825 | 0.0836 | 0.0829 | 0.0782 | 0.0833 |
| TEOS (mol%) | 0.0663 | 1.6307 | 0.3304 | 1.1471 | 0.6181 | 0.6587 |
| HCl (mol%) | 1.5809 | 1.5562 | 1.5767 | 1.5638 | 1.4747 | 1.5715 |
| CTAB (mol%) | 0.1739 | 0.1712 | 0.1735 | 0.1720 | 0.1622 | 0.1729 |
| | | | | | | |
| Visual Precipitate | 630 sec. | 290 sec. | 80 sec. | 175 sec. | 25 sec. | 90 sec. |
| Surface Area ($m^2$/g) | 792.9 | 824.3 | 973.8 | 969.5 | 930.2 | 910.7 |
| Pore Volume (cc/g) | 1.18 | 0.90 | 1.21 | 0.66 | 1.50 | 1.20 |
| Pore Diameter (Å) | 58.7 | 41.8 | 45.1 | 28.8 | 50.4 | 44.2 |
| Stir Temp. | RT | RT | RT | RT | RT | RT |
| Stir Time | 630 sec. | 290 sec. | 80 sec. | 175 sec. | 25 sec. | 90 sec. |
| Heating Temp. (°C) | 100 | 100 | 100 | 100 | 100 | 150 |
| Heating Time (min.) | 40 | 40 | 40 | 40 | 40 | 40 |
| Particle Size (μm) | 1.0-2.0 | 2.0-6.0 | 0.5-2.0 | 1.5-4.0 | 1.5-4.0 | 1.0-3.0 |
| % spherical particles | >90% | 90% | 90% | 90% | >95% | >95% |
| % interconnection | 15% | 20% | 15% | 20% | 10% | 10% |

FIG. 6

| NaF (mol %) | 0.0190 | 0.192 | 0.0390 | 0.167 | 0.0780 | 0.0860 |
|---|---|---|---|---|---|---|
| Sample | TWN3-117 | TWN3-107B | TWN3-59A | TWN3-15A | TWN4-146A | TWN3-15B |
| $H_2O$ (g) | 51.53 | 23.78 | 47.57 | 34.87 | 45.19 | 39.64 |
| EtOH (g) | 2.78 | 22.20 | 5.55 | 11.1 | 5.55 | 11.1 |
| 0.5 Molar NaF solution (g) | 1.19 | 9.52 | 2.38 | 9.53 | 4.76 | 4.76 |
| TEOS (g) | 4.00 | 4.00 | 4.00 | 4 | 4.00 | 4 |
| HCl (g) | 4.40 | 4.40 | 4.40 | 4.4 | 4.40 | 4.4 |
| CTAB (g) | 1.80 | 1.80 | 1.80 | 1.8 | 1.80 | 1.8 |
| | | | | | | |
| $H_2O$ (mol) | 2.9306 | 1.8526 | 2.7769 | 2.4688 | 2.7769 | 2.4688 |
| EtOH (mol) | 0.0603 | 0.4819 | 0.1205 | 0.2409 | 0.1205 | 0.2409 |
| NaF (mol) | 0.0006 | 0.0048 | 0.0012 | 0.0048 | 0.0024 | 0.0024 |
| TEOS (mol) | 0.0188 | 0.0188 | 0.0188 | 0.0188 | 0.0188 | 0.0188 |
| HCl (mol) | 0.0449 | 0.0449 | 0.0449 | 0.0449 | 0.0449 | 0.0449 |
| CTAB (mol) | 0.0049 | 0.0049 | 0.0049 | 0.0049 | 0.0049 | 0.0049 |
| | | | | | | |
| $H_2O$ (mol%) | 93.4511 | 74.5914 | 91.2554 | 86.3536 | 91.2197 | 86.4257 |
| EtOH (mol%) | 1.9243 | 19.4018 | 3.9590 | 8.4278 | 3.9575 | 8.4348 |
| NaF (mol%) | 0.0190 | 0.1916 | 0.0391 | 0.1667 | 0.0782 | 0.0833 |
| TEOS (mol%) | 0.6000 | 0.7576 | 0.6184 | 0.6582 | 0.6181 | 0.6587 |
| HCl (mol%) | 1.4315 | 1.8074 | 1.4753 | 1.5702 | 1.4747 | 1.5715 |
| CTAB (mol%) | 0.1575 | 0.1988 | 0.1623 | 0.1728 | 0.1622 | 0.1729 |
| | | | | | | |
| Visual Precipitate | 185 sec. | 1020 sec. | 110 sec. | 30 sec. | 25 sec. | 90 sec. |
| Surface Area (m$^2$/g) | 1043.9 | 395.7 | 1222.8 | 691.0 | 930.2 | 910.7 |
| Pore Volume (cc/g) | 0.67 | 0.73 | 0.90 | 1.16 | 1.50 | 1.20 |
| Pore Diameter (Å) | 30.3 | 61.7 | 33.8 | 73.5 | 50.4 | 44.2 |
| Stir Temp. | RT | RT | RT | RT | RT | RT |
| Stir Time | 185 sec. | 1020 sec. | 110 sec. | 30 sec. | 25 sec. | 90 sec. |
| Heating Temp. (°C) | 100 | 100 | 100 | 100 | 100 | 100 |
| Heating Time (min.) | 40 | 40 | 40 | 40 | 40 | 40 |
| Particle Size (μm) | Irregular | 0.5-1.5 | 1.5-5.0 | 0.5-1.5 | 1.5-4.0 | 1.0-3.0 |
| % spherical particles | <25% | 50% | >95% | 80% | >95% | >95% |
| % interconnection | NA | 70% | 15% | 30% | 10% | 10% |

FIG. 7

| HCl (mol %) | 0.366 | 3.35 | 0.910 | 2.44 | 1.47 | 1.57 | 1.68 |
|---|---|---|---|---|---|---|---|
| Sample | TWN3-147 | TWN3-148 | TWN3-149 | TWN3-92 | TWN4-146A | TWN3-25 | TWN3-125 |
| H$_2$O (g) | 39.64 | 39.64 | 39.64 | 39.64 | 45.19 | 39.64 | 34.09 |
| EtOH (g) | 11.10 | 11.10 | 11.10 | 11.10 | 5.55 | 11.10 | 16.65 |
| 0.5 Molar NaF solution (g) | 4.76 | 4.76 | 4.76 | 4.76 | 4.76 | 4.76 | 4.76 |
| TEOS (g) | 10.00 | 10.00 | 4.00 | 4.00 | 4.00 | 4.00 | 4.00 |
| HCl (g) | 1.00 | 10.00 | 2.50 | 7.00 | 4.40 | 4.40 | 4.40 |
| CTAB (g) | 1.80 | 1.80 | 1.80 | 1.80 | 1.80 | 1.80 | 1.80 |
| | | | | | | | |
| H$_2$O (mol) | 2.4655 | 2.4741 | 2.4670 | 2.4713 | 2.7769 | 2.4688 | 2.1607 |
| EtOH (mol) | 0.2409 | 0.2409 | 0.2409 | 0.2409 | 0.1205 | 0.2409 | 0.3614 |
| NaF (mol) | 0.0024 | 0.0024 | 0.0024 | 0.0024 | 0.0024 | 0.0024 | 0.0024 |
| TEOS (mol) | 0.0470 | 0.0470 | 0.0188 | 0.0188 | 0.0188 | 0.0188 | 0.0188 |
| HCl (mol) | 0.0102 | 0.1020 | 0.0255 | 0.0714 | 0.0449 | 0.0449 | 0.0449 |
| CTAB (mol) | 0.0049 | 0.0049 | 0.0049 | 0.0049 | 0.0049 | 0.0049 | 0.0049 |
| | | | | | | | |
| H$_2$O (mol%) | 88.4254 | 81.2870 | 88.0239 | 84.3341 | 91.2197 | 86.4257 | 80.9577 |
| EtOH (mol%) | 8.6413 | 7.9161 | 8.5971 | 8.2224 | 3.9575 | 8.4348 | 13.5415 |
| NaF (mol%) | 0.0854 | 0.0782 | 0.0849 | 0.0812 | 0.0782 | 0.0833 | 0.0892 |
| TEOS (mol%) | 1.6871 | 1.5455 | 0.6714 | 0.6421 | 0.6181 | 0.6587 | 0.7050 |
| HCl (mol%) | 0.3659 | 3.3521 | 0.9101 | 2.4372 | 1.4747 | 1.5715 | 1.6820 |
| CTAB (mol%) | 0.1771 | 0.1623 | 0.1762 | 0.1685 | 0.1622 | 0.1729 | 0.1850 |
| | | | | | | | |
| Visual Precipitate | 1170 sec. | 40 sec. | 190 sec. | 75 sec. | 25 sec. | 80 sec. | 225 sec. |
| Surface Area (m$^2$/g) | 483.7 | 910.7 | 837.1 | 714.8 | 930.2 | 1154.6 | 855.2 |
| Pore Volume (cc/g) | 0.83 | 1.08 | 1.14 | 0.76 | 1.50 | 1.22 | 0.98 |
| Pore Diameter (Å) | 61.8 | 42.4 | 56.1 | 57.8 | 50.4 | 37.8 | 44.3 |
| Stir Temp. | RT | RT | RT | RT | RT | RT | RT |
| Stir Time | 1170 sec. | 40 sec. | 190 sec. | 75 sec. | 25 sec. | 80 sec. | 225 sec. |
| Heating Temp. (°C) | 100 | 100 | 100 | 100 | 100 | 100 | 100 |
| Heating Time (min.) | 40 | 40 | 40 | 40 | 40 | 40 | 40 |
| Particle Size (μm) | Irregular | 1.5-3.0 | 1.0-2.5 | 1.5-3.0 | 1.5-4.0 | 1.5-3.0 | 1.0-3.0 |
| % spherical particles | <5% | >95% | 90% | >95% | >95% | >95% | >95% |
| % interconnection | NA | 20% | 40% | 20% | 10% | 10% | 15% |

FIG. 8

| Alcohol (mol %) | 1.92 | 19.4 | 15.4 | 3.96 | 8.44 | 13.5 |
|---|---|---|---|---|---|---|
| Sample | TWN3-117 | TWN3-107B | TWN3-59A | TWN3-2B | TWN4-146A | TWN3-25 |
| $H_2O$ (g) | 51.53 | 23.78 | 27.40 | 45.19 | 39.64 | 34.09 |
| EtOH (g) | 2.78 | 22.20 | 18.50 | 5.00 | 11.10 | 16.65 |
| 0.5 Molar NaF solution (g) | 1.19 | 9.52 | 9.60 | 9.60 | 4.76 | 4.76 |
| TEOS (g) | 4.00 | 4.00 | 4.00 | 4.00 | 4.00 | 4.00 |
| HCl (g) | 4.40 | 4.40 | 4.40 | 4.40 | 4.40 | 4.40 |
| CTAB (g) | 1.80 | 1.80 | 1.20 | 1.20 | 1.80 | 1.80 |
| | | | | | | |
| $H_2O$ (mol) | 2.9306 | 1.8526 | 2.0580 | 3.0455 | 2.4688 | 2.1607 |
| EtOH (mol) | 0.0603 | 0.4819 | 0.4016 | 0.1085 | 0.2409 | 0.3614 |
| NaF (mol) | 0.0006 | 0.0048 | 0.0048 | 0.0048 | 0.0024 | 0.0024 |
| TEOS (mol) | 0.0188 | 0.0188 | 0.0188 | 0.0188 | 0.0188 | 0.0188 |
| HCl (mol) | 0.0449 | 0.0449 | 0.0449 | 0.0449 | 0.0449 | 0.0449 |
| CTAB (mol) | 0.0049 | 0.0049 | 0.0033 | 0.0033 | 0.0049 | 0.0049 |
| | | | | | | |
| $H_2O$ (mol%) | 93.4511 | 74.5914 | 78.9367 | 92.2427 | 86.4257 | 80.9577 |
| EtOH (mol%) | 1.9243 | 19.4018 | 15.4025 | 3.2872 | 8.4348 | 13.5415 |
| NaF (mol%) | 0.0190 | 0.1916 | 0.1841 | 0.1454 | 0.0833 | 0.0892 |
| TEOS (mol%) | 0.6000 | 0.7576 | 0.7217 | 0.5699 | 0.6587 | 0.7050 |
| HCl (mol%) | 1.4315 | 1.8074 | 1.7219 | 1.3597 | 1.5715 | 1.6820 |
| CTAB (mol%) | 0.1575 | 0.1988 | 0.1263 | 0.0997 | 0.1729 | 0.1850 |
| | | | | | | |
| Visual Precipitate | 185 sec. | 1020 sec. | 360 sec. | 25 sec. | 80 sec. | 225 sec. |
| Surface Area (m²/g) | 1043.9 | 395.7 | 993.8 | 930.2 | 1154.6 | 855.2 |
| Pore Volume (cc/g) | 0.67 | 0.73 | 1.09 | 1.50 | 1.22 | 0.98 |
| Pore Diameter (Å) | 30.3 | 61.7 | 36.1 | 50.4 | 37.8 | 44.3 |
| Stir Temp. | RT | RT | RT | RT | RT | RT |
| Stir Time | 185 sec. | 1020 sec. | 360 sec. | 25 sec. | 80 sec. | 225 sec. |
| Heating Temp. (°C) | 100 | 100 | 150 | 100 | 100 | 100 |
| Heating Time (min.) | 40 | 40 | 40 | 40 | 40 | 40 |
| Particle Size (μm) | Irregular | 0.5-1.5 | 1.0-3.0 | 1.5-4.0 | 1.5-3.0 | 1.0-3.0 |
| % spherical particles | <25% | 50% | >90% | >95% | >95% | >95% |
| % interconnection | NA | 70% | 20% | 10% | 10% | 15% |

FIG. 9

| CTAB (mol %) | 0.0170 | 1.42 | 0.115 | 0.162 | 0.253 |
|---|---|---|---|---|---|
| Sample | TWN3-120 | TWN3-118 | TWN3-5 | TWN4-146A | TWN3-10B |
| $H_2O$ (g) | 39.64 | 39.64 | 34.80 | 45.19 | 27.4 |
| EtOH (g) | 11.10 | 11.10 | 11.10 | 5.55 | 18.50 |
| 0.5 Molar NaF solution (g) | 4.76 | 4.76 | 9.60 | 4.76 | 9.60 |
| TEOS (g) | 0.40 | 4.00 | 4.00 | 4.00 | 4.00 |
| HCl (g) | 4.40 | 4.40 | 4.40 | 4.40 | 4.40 |
| CTAB (g) | 0.18 | 15.00 | 1.20 | 1.80 | 2.40 |
| | | | | | |
| $H_2O$ (mol) | 2.4688 | 2.4688 | 2.4688 | 2.7769 | 2.0580 |
| EtOH (mol) | 0.2409 | 0.2409 | 0.2409 | 0.1205 | 0.4016 |
| NaF (mol) | 0.0024 | 0.0024 | 0.0048 | 0.0024 | 0.0048 |
| TEOS (mol) | 0.0019 | 0.0188 | 0.0188 | 0.0188 | 0.0188 |
| HCl (mol) | 0.0449 | 0.0449 | 0.0449 | 0.0449 | 0.0449 |
| CTAB (mol) | 0.0005 | 0.0412 | 0.0033 | 0.0049 | 0.0066 |
| | | | | | |
| $H_2O$ (mol%) | 87.0774 | 85.3436 | 86.4023 | 91.2197 | 78.8372 |
| EtOH (mol%) | 8.4984 | 8.3292 | 8.4325 | 3.9575 | 15.3831 |
| NaF (mol%) | 0.0839 | 0.0823 | 0.1680 | 0.0782 | 0.1839 |
| TEOS (mol%) | 0.0664 | 0.6505 | 0.6585 | 0.6181 | 0.7208 |
| HCl (mol%) | 1.5834 | 1.5519 | 1.5711 | 1.4747 | 1.7197 |
| CTAB (mol%) | 0.0174 | 1.4227 | 0.1152 | 0.1622 | 0.2523 |
| | | | | | |
| Visual Precipitate | 360 sec. | 420 sec. | 95 sec. | 25 sec. | 270 sec. |
| Surface Area ($m^2/g$) | 558.1 | 663.6 | 950.4 | 930.2 | 971.7 |
| Pore Volume (cc/g) | 0.52 | 0.38 | 1.33 | 1.50 | 0.97 |
| Pore Diameter (Å) | 32.5 | 22.7 | 48.9 | 50.4 | 31.9 |
| Stir Temp. | RT | RT | RT | RT | RT |
| Stir Time | 360 sec. | 420 sec. | 95 sec. | 25 sec. | 270 sec. |
| Heating Temp. (°C) | 100 | 100 | 150 | 100 | 150 |
| Heating Time (min.) | 40 | 40 | 40 | 40 | 40 |
| Particle Size (μm) | 0.5-2.0 | 0.5-2 | 1.0-3 | 1.5-4.0 | 1.0-3 |
| % spherical particles | >95% | 90% | >95% | >95% | 90% |
| % interconnection | 20% | 25% | 10% | 10% | 15% |

FIG. 10

| Heating Temp. (°C) | 50 | 70 | 90 | 100 | 150 | 200 |
|---|---|---|---|---|---|---|
| Sample | TWN3-46C | TWN3-46B | TWN3-46A | TWN3-25 | TWN3-15B | TWN3-123 |
| $H_2O$ (g) | 39.64 | 39.64 | 39.64 | 39.64 | 39.64 | 39.64 |
| EtOH (g) | 11.1 | 11.1 | 11.1 | 11.1 | 11.1 | 11.1 |
| 0.5 Molar NaF solution (g) | 4.76 | 4.76 | 4.76 | 4.76 | 4.76 | 4.76 |
| TEOS (g) | 4 | 4 | 4 | 4 | 4 | 4 |
| HCl (g) | 4.4 | 4.4 | 4.4 | 4.4 | 4.4 | 4.4 |
| CTAB (g) | 1.8 | 1.8 | 1.8 | 1.8 | 1.8 | 1.8 |
| $H_2O$ (mol) | 2.4688 | 2.4688 | 2.4688 | 2.4688 | 2.4688 | 2.4688 |
| EtOH (mol) | 0.2409 | 0.2409 | 0.2409 | 0.2409 | 0.2409 | 0.2409 |
| NaF (mol) | 0.0024 | 0.0024 | 0.0024 | 0.0024 | 0.0024 | 0.0024 |
| TEOS (mol) | 0.0188 | 0.0188 | 0.0188 | 0.0188 | 0.0188 | 0.0188 |
| HCl (mol) | 0.0449 | 0.0449 | 0.0449 | 0.0449 | 0.0449 | 0.0449 |
| CTAB (mol) | 0.0049 | 0.0049 | 0.0049 | 0.0049 | 0.0049 | 0.0049 |
| $H_2O$ (mol%) | 86.4257 | 86.4257 | 86.4257 | 86.4257 | 86.4257 | 86.4257 |
| EtOH (mol%) | 8.4348 | 8.4348 | 8.4348 | 8.4348 | 8.4348 | 8.4348 |
| NaF (mol%) | 0.0833 | 0.0833 | 0.0833 | 0.0833 | 0.0833 | 0.0833 |
| TEOS (mol%) | 0.6587 | 0.6587 | 0.6587 | 0.6587 | 0.6587 | 0.6587 |
| HCl (mol%) | 1.5715 | 1.5715 | 1.5715 | 1.5715 | 1.5715 | 1.5715 |
| CTAB (mol%) | 0.1729 | 0.1729 | 0.1729 | 0.1729 | 0.1729 | 0.1729 |
| Visual Precipitate | 90 sec. | 90 sec. | 90 sec. | 80 sec. | 90 sec. | 85 sec. |
| Surface Area (m²/g) | 910.7 | 908.8 | 1019.4 | 1154.6 | 910.7 | 613.1 |
| Pore Volume (cc/g) | 0.52 | 0.71 | 1.20 | 1.22 | 1.20 | 1.15 |
| Pore Diameter (Å) | 27.9 | 32.4 | 41.3 | 33.6 | 44.2 | 81.9 |
| Stir Temp. | RT | RT | RT | RT | RT | RT |
| Stir Time | 90 sec. | 90 sec. | 90 sec. | 80 sec. | 90 sec. | 85 sec. |
| Heating Temp. (°C) | 50 | 70 | 90 | 100 | 150 | 200 |
| Heating Time (min.) | 40 | 40 | 40 | 40 | 40 | 40 |
| Particle Size (μm) | 0.5-2.0 | 1.0-2.5 | 1.5-3.0 | 1.5-3.0 | 1.0-3.0 | 1.5-3.5 |
| % spherical particles | >90% | >95% | >95% | >95% | >95% | >95% |
| % interconnection | 25% | 15% | 10% | 10% | 10% | 10% |

FIG. 11

| Heating Time (min.) | 10 | 20 | 40 | 60 | 80 | 120 |
|---|---|---|---|---|---|---|
| Sample | TWN3-51A | TWN4-161A | TWN4-161B | TWN4-161C | TWN4-161D | TWN3-102C |
| $H_2O$ (g) | 39.64 | 39.64 | 39.64 | 39.64 | 39.64 | 39.64 |
| EtOH (g) | 11.1 | 11.1 | 11.1 | 11.1 | 11.1 | 11.1 |
| 0.5 Molar NaF solution (g) | 4.76 | 4.76 | 4.76 | 4.76 | 4.76 | 4.76 |
| TEOS (g) | 4 | 4 | 4 | 4 | 4 | 4 |
| HCl (g) | 4.4 | 4.4 | 4.4 | 4.4 | 4.4 | 4.4 |
| CTAB (g) | 1.8 | 1.8 | 1.8 | 1.8 | 1.8 | 1.8 |
| $H_2O$ (mol) | 2.4688 | 2.4688 | 2.4688 | 2.4688 | 2.4688 | 2.4688 |
| EtOH (mol) | 0.2409 | 0.2409 | 0.2409 | 0.2409 | 0.2409 | 0.2409 |
| NaF (mol) | 0.0024 | 0.0024 | 0.0024 | 0.0024 | 0.0024 | 0.0024 |
| TEOS (mol) | 0.0188 | 0.0188 | 0.0188 | 0.0188 | 0.0188 | 0.0188 |
| HCl (mol) | 0.0449 | 0.0449 | 0.0449 | 0.0449 | 0.0449 | 0.0449 |
| CTAB (mol) | 0.0049 | 0.0049 | 0.0049 | 0.0049 | 0.0049 | 0.0049 |
| $H_2O$ (mol%) | 86.4257 | 86.4257 | 86.4257 | 86.4257 | 86.4257 | 86.4257 |
| EtOH (mol%) | 8.4348 | 8.4348 | 8.4348 | 8.4348 | 8.4348 | 8.4348 |
| NaF (mol%) | 0.0833 | 0.0833 | 0.0833 | 0.0833 | 0.0833 | 0.0833 |
| TEOS (mol%) | 0.6587 | 0.6587 | 0.6587 | 0.6587 | 0.6587 | 0.6587 |
| HCl (mol%) | 1.5715 | 1.5715 | 1.5715 | .1.5715 | 1.5715 | 1.5715 |
| CTAB (mol%) | 0.1729 | 0.1729 | 0.1729 | 0.1729 | 0.1729 | 0.1729 |
| Visual Precipitate | 85 sec. | 75 sec. | 75 sec. | 75 sec. | 75 sec. | 90 sec. |
| Surface Area ($m^2$/g) | 744.1 | 1124.9 | 991.6 | 908.8 | 910.7 | 714.8 |
| Pore Volume (cc/g) | 0.32 | 1.12 | 1.29 | 1.36 | 1.56 | 0.81 |
| Pore Diameter (Å) | 19.9 | 31.6 | 40.4 | 50.4 | 58.2 | 49.7 |
| Stir Temp. | RT | RT | RT | RT | RT | RT |
| Stir Time | 85 sec. | 80 sec. | 80 sec. | 80 sec. | 80 sec. | 90 sec. |
| Heating Temp. (°C) | 100 | 100 | 100 | 100 | 100 | 100 |
| Heating Time (min.) | 10 | 20 | 40 | 60 | 90 | 120 |
| Particle Size (μm) | 0.5-2.0 | 1.0-2.5 | 1.5-3.0 | 1.0-3.5 | 1.0-3.5 | 1.5-4.0 |
| % spherical particles | >90% | >90% | >95% | >95% | >90% | >95% |
| % interconnection | 20% | 15% | 10% | 10% | 20% | 25% |

MESOPOROUS INORGANIC OXIDE SPHERES AND METHOD OF MAKING SAME

RELATED APPLICATION DATA

This application claims the benefit of U.S. Provisional Patent Application No. 60/632,830, filed Dec. 2, 2004, entitled "Mesoporous Silicate Spheres and Method of Making Same," which is incorporated herein by reference in its entirety.

FIELD OF THE INVENTION

The present invention generally relates to the field of inorganic oxide particles. In particular, the present invention is directed to a mesoporous inorganic oxide spherical particle and methods of synthesizing the same.

BACKGROUND OF THE INVENTION

Porous silica is commonly used as a matrix material for chromatographic separations. With surface areas in the neighborhood of 300 meter(m)$^2$/gram(g), commercially available chromatographic grade silicas possess a relatively high surface area. Mesoporous materials, which typically possess surface areas in excess of 1000 m$^2$/g and even as high as 1600 m$^2$/g, are commonly used as adsorbents, catalysts, and catalytic supports. With such high surface areas, these materials should provide superior separating ability as a chromatographic matrix in liquid chromatography (LC), flash liquid chromatography (FLC), and high performance liquid chromatography (HPLC). Mesoporous inorganic oxide particles differ from conventional porous inorganic oxides in that their surface areas are significantly larger than those of conventional porous inorganic oxides.

Various techniques exist for synthesizing mesoporous silica. For example, U.S. Pat. No. 4,554,211 to Arika et al., discloses a technique for synthesizing mesoporous silica spheres using an emulsion templating mechanism in basic solution. Other patents describing techniques for synthesizing large pore oxides in basic solution include U.S. Pat. No. 5,068,216 to Johnson et al., U.S. Pat. No. 5,168,828 to Degnan et al., and U.S. Pat. No. 5,308,602 to Calabro et al.

Recently, processes have been developed for synthesizing mesoporous silica spheres in acidic solution. In an article by Stucky et al., Oil-water Interface Templating of Mesoporous Macroscale Structures, *Science*, 1996, 273, 768-771 an emulsion process for synthesizing mesoporous silica spheres was described. A silicon alkoxide (TEOS) was dissolved in an organic solvent, typically mesitylene. This mixture was added, slowly over a period of 30 minutes, to an aqueous acidic solution containing a cationic ammonium surfactant (CTAB). Stucky found that by varying the stir rate during the course of the reaction, the particle morphology could be changed. At slower stirring rates, the reaction mixture produced fibers, and as the stirring rate was increased, the amount of fibers decreased with the increasing amounts of spheres. It was shown that the size of the spherical particles decreases with increasing stirring rates. Scanning Electron Microscopy (SEM) indicated the particles were hollow and spherical in nature. It was shown that these hollow spheres were brittle, and could be crushed with a spatula. The brittle nature of the spheres, in combination with the fact that they were not porous throughout their interior, seemed to indicate unfavorable characteristics for their use a chromatographic matrix.

Qi et al., in the article Micrometer-Sized Mesoporous Silica Spheres Grown Under Static Conditions, *Chemistry of Materials*, 1998, 10, 1623-1626, describes the formation of mesoporous silica spheres by a process using a cationic-nonionic surfactant mixture in aqueous acidic conditions. A typical synthesis involved stirring an aqueous acidic solution of a cationic ammonium surfactant (CTAB), and a nonionic surfactant (decaethylene glycol monohexadecylether), to which an alkoxysilane was added (TEOS). This material was presumably porous throughout its interior, although this was not specifically addressed in the article. The material seems to possess desirable characteristics, a high surface area (1042 m$^2$/g) and ~5 micrometer (µm) particle size, for use as a chromatographic matrix, but the long synthesis time (16 hours) and the use of a mixture of surfactants rather than one does not seem desirable for use on a commercial scale.

Yet another process for synthesizing mesoporous silica spheres in acidic aqueous solution is described by Ozin et al., in the article Synthesis of Mesoporous Spheres Under Quiescent Aqueous Acidic Conditions, *Journal of Materials Chemistry*, 1998, 8(3), 743-750. An acidic aqueous solution consisting of an alkoxysilane (TEOS) and a cationic ammonium surfactant (CATCl), was allowed to react under static conditions for a period of 7-10 days at 80° C. It was also demonstrated that spherical particles could be synthesized at room temperature with a modified reaction mixture. Particle sizes appeared to range from 1-30 µm. While the spheres Ozin et al. produced are monodisperse, the lower surface area (750 m$^2$/g) and long synthesis time (7-10 days) makes the material and process unattractive for use on a commercial scale. Monodispersity refers to the degree to which the particles are uniform in size and shape, and must take into consideration the percentage of spherical particles, the size range of these particles, and their percent interconnectivity.

All of the processes described above produce materials which exhibit regular powder X-ray diffraction patterns with one or more relatively narrow diffraction peaks. This indicates that they contain a relatively ordered arrangement of pores. It appears that the materials produced by these processes are similar to SBA-3, a mesoporous material with a hexagonal arrangement of linear pores ("Mesostructure Design with Gemini Surfactants: Supercage Formation in a Three-Dimensional Array", Huo et al., *Science*, 1995, 268, 1324). SBA-3 is similar to the more widely known MCM-41, which has an identical arrangement of pores but is synthesized in basic solution ("Ordered Mesoporous Molecular Sieves Synthesized by a Liquid-Crystal Templating Mechanism," Kresge et al., *Nature*, 1992, 359, 710). While mesoporous silica having such ordered pores has use in a variety of contexts, the processes for synthesizing such materials tends to take longer, or be more complex, than is commercially desired.

Spherical Mesoporous silica particles have been produced using a reaction mixture including fluoride. See "Spherical MSU-1 Mesoporous Silica Particles Tuned for HPLC," Boissière, C.; Kummel, M.; Persin, M.; Larbot, A.; Prouzet, E. *Adv. Funct. Mater.* 2001, 11, 129-134. Such particles have relatively small pore volumes (0.45 cm$^3$/g) and require long synthesis times (48-72 hours).

Spherical mesoporous silica particles have also been produced using a reaction mixture including ethanol. See "Counterion Effect in Acid Synthesis of Mesoporous Silica Materials", Lin, H.-P.; Kao, C.-P.; Mou, C.-Y.; Liu, S.-B. *J Phys. Chem. B.* 2000, 104, 7885-7894. Such particles are produced using a basic, as opposed to acidic, reaction mixture without the use of fluoride and require long synthesis times (6-48 hours).

U.S. Pat. No. 6,334,988 to Gallis et al., the disclosure of which is incorporated herein in its entirety, discloses a method of making mesoporous silicates from an acidic reaction mixture having a mineral acid, an inorganic oxide source, a surfactant, and water. However, the pore volume of the mesoporous silicates produced by such a method ranges from 0.35 cm$^3$/g to 0.75 cm$^3$/g. Further, the heating temperatures required to achieve greater than 90% spherical particles range from 110° C. to 210° C. It is desirable to have mesoporous inorganic oxide spherical particles having larger pore volumes and larger pore diameters than was previously achievable and methods of making such particles. It is also desirable to be able to produce mesoporous inorganic oxide spherical particles with desirable properties in a shorter period of time than in prior methods.

SUMMARY OF THE INVENTION

In one embodiment, the present invention provides a method of preparing mesoporous inorganic oxide spherical particles. The method includes providing a reaction mixture including a proton donor, a source of inorganic oxide, and a source of fluoride. The method also includes heating the reaction mixture for not more than 120 minutes to produce mesostructured inorganic oxide particles; and removing organic material from the mesostructured inorganic oxide particles to form the mesoporous inorganic oxide spherical particles.

In another embodiment, the present invention provides a method of preparing a mesoporous inorganic oxide spherical particle. The method includes providing a reaction mixture including a mineral acid, a source of inorganic oxide, and an alcohol. The method also includes heating the reaction mixture for not more than 120 minutes to produce a mesostructured inorganic oxide sphere; and removing organic material from the mesostructured inorganic oxide sphere to form the mesoporous inorganic oxide spherical particle.

In one embodiment, the present invention provides a method of preparing a mesoporous inorganic oxide spherical particle having a pore volume of greater than 0.75 cm$^3$/g. The method includes providing a reaction mixture including a source of inorganic oxide, the reaction mixture capable of forming mesoporous inorganic oxide sphere having a pore volume of greater than 0.75 cm$^3$/g when heated in step (b) and subjected to step (c). The method also includes heating the reaction mixture for not more than 40 minutes at a temperature of not more than about 100° C. to produce mesostructured inorganic oxide particles, at least about 90% of which are spherical; and removing organic material from the mesostructured inorganic oxide particles to form mesoporous inorganic oxide spherical particles having a pore volume of greater than 0.75 cm$^3$/g.

In one embodiment, the present invention provides a plurality of mesoporous inorganic oxide spherical particles, each comprising one or more pores, wherein the spherical particles have a pore volume of greater than 0.75 cm$^3$/g and an average pore diameter of greater than 37 Angstroms.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein:

FIGS. 5 to 11 show various data for a plurality of examples of mesoporous inorganic oxide spheres produced according to examples of the method of the present invention.

DETAILED DESCRIPTION OF THE INVENTION

Figure 1:
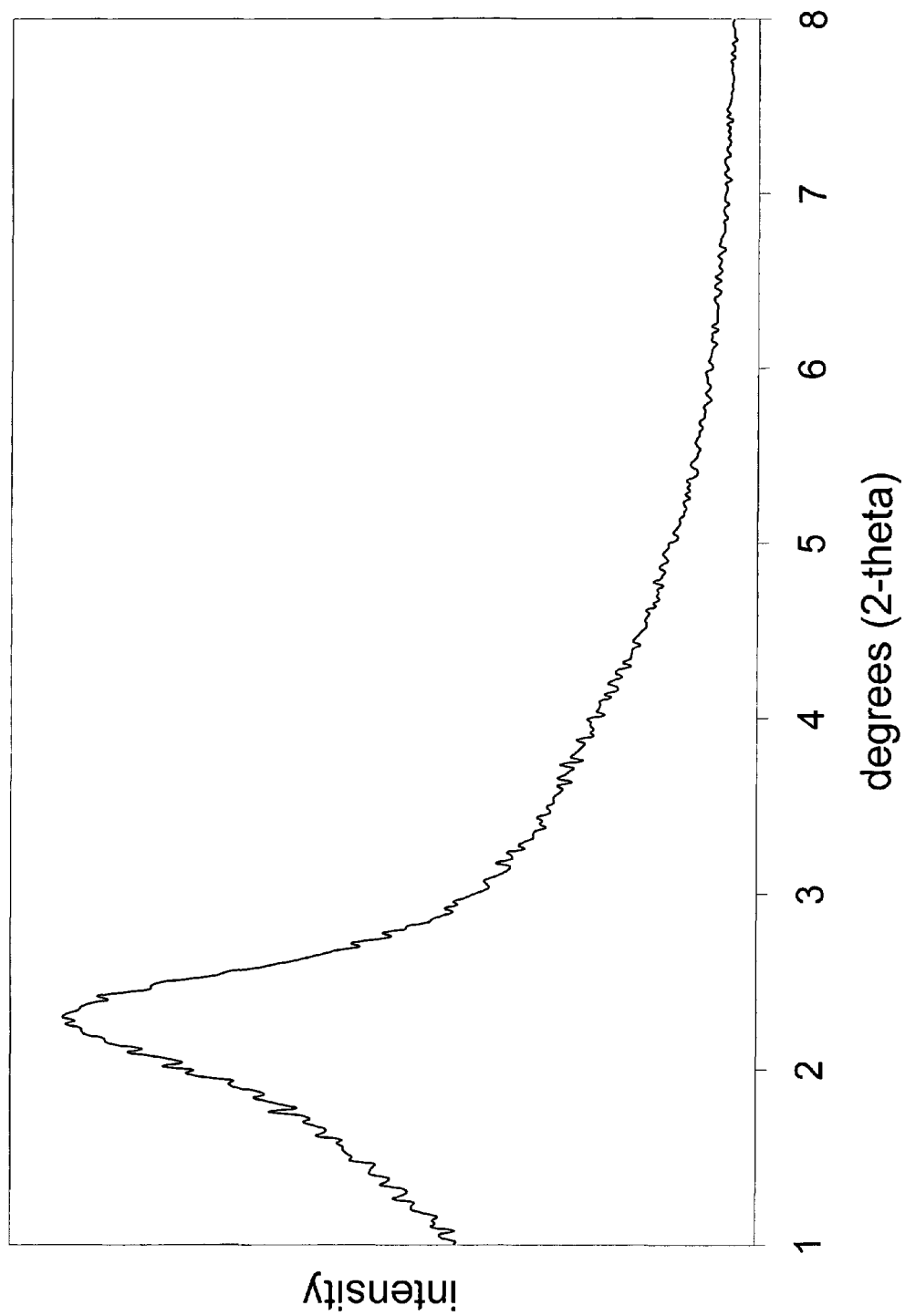
FIG. 1 shows a plot of a powder X-ray diffraction ("XRD") analysis for one example of mesoporous inorganic oxide spheres according to the present invention.

The present disclosure includes improved methods of synthesizing mesoporous inorganic oxide particles, particularly silicate particles. The synthesis occurs using an acidic aqueous reaction procedure over a shorter period of time than other synthesis for similar particles. Mesoporous inorganic oxide particles differ from conventional porous inorganic oxides in that their surface areas are significantly larger than those of conventional porous inorganic oxides. For example, the surface area of the mesoporous inorganic oxide particles of the present invention are in excess of about 800 m$^2$/g and, in some cases, in excess of 1200 m$^2$/g. In comparison, well known inorganic oxide, conventional chromatographic grade silicas, generally have a surface area less than 500 m$^2$/g, and commonly less than 300 m$^2$/g.

The methods of the present invention provide mesoporous inorganic oxide particles that are spherical and have a greater pore volume than known mesoporous inorganic oxide particles.

A particle is considered spherical if it displays a spheroidal shape, whether free standing or attached to other particles. The spherical quality of a particle is measured using scanning electron microscopy (SEM). A spherical particle provides greater functionality than a non-spherical particle. Spherical particles pack together, for example in a chromatography column, such that there is always some empty space between them. In chromatography it is essential that some space exist between the column particles such that the sample molecules can flow around the column particles. Spherical particles also have the advantage of being more readily recognized by microscopic techniques, such as fluorescence microscopy and electron microscopy, which have difficulty distinguishing non-spherical particles from one another.

The temperature required during synthesis over the shorter periods of time to achieve a high percentage of spherical particles is lower than that of known processes. A lower temperature, preferably a temperature below the boiling point of water (100° C.), provides for more efficient and affordable scaling of the synthesis to commercial scales. The methods of the present invention utilize a heating step that heats the reaction mixture at a temperature of about 50° C. to about 230° C. In one example of the present invention, greater than 95% spherical particles are produced at a temperature of about 70° C. In another example of the present invention, greater than 90% spherical particles are produced at a temperature of about 25° C. (room temperature, "RT").

In one embodiment of the present invention, a method of preparing a mesoporous inorganic oxide spherical particle is provided. The method includes providing a reaction mixture having a source of inorganic oxide and being capable of forming a mesoporous inorganic oxide sphere. The reaction mixture is heated for a selected time and organic material is removed from the resulting product to form a mesoporous inorganic oxide spherical particle having a desirably large pore volume.

A reaction mixture according to the present invention may also include other constituents. Other constituents may include, but are not limited to, a source of fluoride, an alcohol, a proton donor, a surfactant, and water. The reaction mixture may also include a metal salt. The constituents of a reaction mixture may be mixed (e.g., by stirring) for a selected time prior to the mixture being heated.

In one embodiment of the present invention, a source of inorganic oxide may include any material that is a source of silicate. In one aspect, a source of silicate can include a compound having a formula $Si(OR^1)(OR^2)(OR^3)(OR^4)$ where Si is silicon, O is oxygen, and $R^1$, $R^2$, $R^3$, and $R^4$ are alkyl chains having 1 to 4 carbon atoms. Examples of sources of silicate include, but are not limited to, tetraethoxysilane, tetramethoxysilane, tetrapropoxysilane, and any combinations thereof. In one embodiment of the present invention, the source of inorganic oxide is tetraethoxysilane (also known as tetraethyl orthosilicate or TEOS) sold by Sigma-Aldrich.

In one example, an inorganic oxide may be present in the reaction mixture of the present invention in an amount from about 0.017 mole (mol) % to about 1.6 mol %. In another example, an inorganic oxide may be present in the reaction mixture of the present invention in an amount from about 0.3 mol % to about 1.2 mol %. In yet another example, an inorganic oxide may be present in the reaction mixture of the present invention in an amount from about 0.6 mol % to about 0.8 mol %. In still another example, an inorganic oxide may be present in the reaction mixture of the present invention in an amount of about 0.6 mol %.

In one embodiment of the present invention, the source of fluoride is a salt that includes a fluoride ion. Examples of suitable sources of fluoride include, but are not limited to, sodium fluoride, potassium fluoride, ammonium fluoride, other fluoride salts, and any combinations thereof. In one embodiment of the present invention, the source of fluoride is a 0.5 Molar (M) solution of sodium fluoride prepared from sodium fluoride sold by Sigma-Aldrich.

In one example, a source of fluoride is present in the reaction mixture of the present invention in an amount from about 0.019 mol % to about 0.2 mol %. In another example, a source of fluoride is present in the reaction mixture of the present invention in an amount from about 0.039 mol % to about 0.17 mol %. In yet another example, a source of fluoride is present in the reaction mixture of the present invention in an amount from about 0.072 mol % to about 0.1 mol %. In still another example, a source of fluoride may be present in the reaction mixture of the present invention in an amount of about 0.08 mol %.

In one embodiment of the present invention, an alcohol is a water-miscible alcohol. Examples of water-miscible alcohols include, but are not limited to, ethanol, methanol, n-propanol, isopropanol, and any combinations thereof. In one example, an alcohol includes 200 proof ethanol sold by AAPER Alcohol and Chemical Co.

In one example, an alcohol is present in the reaction mixture of the present invention in an amount from about 1.9 mol % to about 20 mol %. In another example, an alcohol is present in the reaction mixture of the present invention in an amount from about 2.9 mol % to about 15.4 mol %. In yet another example, an alcohol is present in the reaction mixture of the present invention in an amount from about 3.9 mol % to about 13.5 mol %. In still another example, an alcohol may be present in the reaction mixture of the present invention in an amount of about 4 mol %.

In one embodiment of the present invention, a proton donor includes an acid. Examples of acids suitable for use as a proton donor include, but are not limited to, HCl, HBr, HI, $HNO_3$, $H_2SO_4$. In one example, a proton donor includes a concentrated (37.2 wt. %) solution of hydrochloric acid sold by Fischer Scientific.

In one example, a proton donor is present in the reaction mixture of the present invention in an amount from about 0.3 mol % to about 3.4 mol %. In another example, a proton donor is present in the reaction mixture of the present invention in an amount from about 0.9 mol % to about 2.7 mol %. In yet another example, a proton donor is present in the reaction mixture of the present invention in an amount from about 1.39 mol % to about 1.76 mol %. In still another example, a proton donor is present in the reaction mixture of the present invention in an amount of about 1.5 mol %.

In one embodiment of the present invention, a surfactant includes a cationic surfactant. In another embodiment of the present invention, a surfactant includes a cationic ammonium having a formula $R^1R^2R^3R^4N^+X^-$, where $R^1$, $R^2$ and $R^3$ are alkyl chains consisting of 1 to 6 carbon atoms, $R^4$ is an alkyl chain consisting of 12 to 24 carbon atoms and $X^-$ represents a counterion to said surfactant, said counterion selected from the group consisting of $Cl^-$, $Br^-$, $I^-$ and $OH^-$. In yet another embodiment of the present invention, a surfactant includes a tri-block copolymer $EO_xPO_yEO_x$, where EO is polyethylene oxide, PO is polypropylene oxide and x ranges from 5 to 106, y ranges from 30 to 85 and z ranges from 5 to 106. In still yet another embodiment of the present invention, a surfactant includes a salt having a trialkylammonium cation and a halide anion. In a further embodiment of the present invention, multiple surfactants can be used. Using multiple surfactants is commercially advantageous in that various pore diameters and physical properties are introduced into the material in a single process.

Examples of suitable surfactants include, but are not limited to, cetyltrimethylammonium bromide, cetyltrimethylammonium chloride, tetradecyltrimethylammonium bromide, lauryltrimethylammonium bromide, lauryltrimethylammonium chloride, tetradecyltrimethylammonium chloride, poly(ethylene glycol)-block-poly(propylene glycol)-block-poly(ethylene glycol), and any combinations thereof. In one example, a surfactant includes cetyltrimethylammonium bromide (CTAB) sold by Sigma-Aldrich.

In one example, a surfactant is present in the reaction mixture of the present invention in an amount from about 0.01 mol % to about the limit of solubility. In another example, a surfactant is present in the reaction mixture of the present invention in an amount from about 0.119 mol % to about 0.26 mol %. In yet another example, a surfactant is present in the reaction mixture of the present invention in an amount of about 0.16 mol %.

Table 1 summarizes several example approximate mol % ranges for various constituents that may be present in a reaction mixture according to the present invention.

TABLE 1

Example reaction mixture constituent ranges

| Reaction Mixture Constituent | Example approximated ranges of mole % (mol %) in reaction mixture |
|---|---|
| Inorganic Oxide | 0.0174 mol %-1.63 mol % |
|  | 0.318 mol %-1.20 mol % |
|  | 0.618 mol %-0.760 mol % |
| Fluoride | 0.0190 mol %-0.192 mol % |
|  | 0.0390 mol %-0.167 mol % |
|  | 0.0720 mol %-0.0990 mol % |
| Alcohol | 1.92 mol %-19.4 mol % |
|  | 2.94 mol %-15.4 mol % |
|  | 3.96 mol %-13.5 mol % |
| Proton Donor | 0.366 mol %-3.35 mol % |
|  | 0.910 mol %-2.68 mol % |
|  | 1.39 mol %-1.76 mol % |
| Surfactant | 0.01 mol %-limit of solubility |
|  | 0.115 mol %-0.253 mol % |

One embodiment of a reaction mixture according to the present invention may include an inorganic oxide, a source of fluoride, an alcohol, a proton donor, a surfactant, and water. In one example, a reaction mixture according to this embodiment may include TEOS, sodium fluoride, ethanol, hydrochloric acid, CTAB and water. In another example, a reaction mixture according to this embodiment may include about 0.6 mol % TEOS, about 0.08 mol % sodium fluoride, about 4 mol % ethanol, about 1.5 mol % HCl, about 0.16 mol % CTAB, and about 91.2 mol % water.

In one embodiment of the present invention, the constituents of a reaction mixture are combined and mixed until chemically homogenous. In one example, this combination and mixing can be done at room temperature. In another example, the mixing can be done at a temperature of about 25° C. to about 35° C. The mixing may be accomplished by stirring, by sonication involving use of a sonication horn of the type sold by Heat Systems-Ultrasonics, Inc. of Farmingdale, N.Y. (one model of sonication horn operating at a frequency and maximum power, respectively, of 20,000 kHz and 475 watts), or by any other technique or techniques yielding a chemically homogenous mixture. After the addition of all reaction mixture constituents, the mixing is continued until the reaction mixture is sufficiently polymerized such that a mesostructured inorganic oxide sphere may be formed upon heating the reaction mixture as discussed in greater detail below. In one example, sufficient polymerization is indicated by the reaction mixture turning opaque. As used in this context and in the claims, an "opaque" mixture means a mixture having a transparent to white color and containing a suspension of very small particles that cannot be captured by Buchner filtration on VWR qualitative filter paper grade 413. Typical times for mixing include about 15 seconds to about 2.5 hours, depending on the composition of the reaction mixture. In another example, the time of mixing is about 25 sec. to about 360 sec. While it is typically advantageous to achieve chemical homogeneity as quickly as possible, in some cases it may be desirable to extend the mixing period. This can be achieved by reducing either the acid and/or fluoride concentrations and/or increasing the ethanol concentration in the reaction mixture.

The reaction mixture is then heated at a temperature, time, and pressure sufficient to form one or more mesostructured inorganic oxide spheres. A mesostructured inorganic oxide sphere includes inorganic material, for example inorganic oxide, and organic material, for example surfactant, intimately combined as a composite particle. The heating step can take place in any vessel capable of withstanding the selected temperature, time, and pressure. One example of a vessel suitable for the heating step is a Teflon bottle. Another example of a vessel suitable for the heating step is a stainless steel autoclave, such as model 4748 and model 4749 t-lined stainless steel autoclaves sold by Parr Instruments Co. of Moline, Ill.

The reaction mixture is heated during this step at a temperature sufficient to produce the mesostructured inorganic oxide sphere. In one example, the reaction mixture is heated at a temperature from about 50° C. to about 230° C. In another example, the reaction mixture is heated at a temperature from about 70° C. to about 200° C. In yet another example, the reaction mixture is heated at a temperature from about 90° C. to about 150° C. In still another example, the reaction mixture is heated at a temperature below about 100° C. In still yet another example, the reaction mixture is heated at a temperature of about 70° C.

The heating step occurs for a period of time sufficient to produce the mesostructured inorganic oxide sphere at the selected temperature. Lower temperatures typically require longer time for the same reaction mixture components. In one example, the reaction mixture is heated for not more than 120 minutes. In another example, the reaction mixture may be heated for a time that may range from about 10 minutes to about 80 minutes. In yet another example, the reaction mixture may be heated for a time that may range from about 20 minutes to about 60 minutes. In still another example, the reaction mixture may be heated for about 40 minutes.

The resulting mesostructured inorganic oxide sphere can be separated from any remaining reaction mixture by a conventional technique, such as filtration. The filtered mesostructured inorganic oxide sphere can be dried using a conventional technique, such as vacuum filtration. The filtration and drying steps may be combined or separate steps. In one example, the drying of a mesostructured inorganic oxide sphere is performed at about room temperature. In another example the drying can occur at any temperature as long as it is not high enough to cause decomposition of the surfactant.

Organic material, such as surfactant, is removed from a mesostructured inorganic oxide sphere to produce a mesoporous inorganic oxide sphere. Examples of suitable techniques for removing the organic material include, but are not limited to, burn away of the organic material away with such a technique as calcining, wash-out of the organic material, ion exchange, and any combination thereof. In one example, the organic material is removed by heating the material to a temperature in the range of about 400° C. to about 600° C. with a temperature ramp of about 0.2° C./minute to about 5° C./minute, preferably no more than 2° C./minute, and then maintaining the material at such temperature for at least about 6 hours. In another example, the organic material is removed in a two-step process where the mesostructured inorganic oxide sphere is heated at a temperature ramp of about 2° C./minute to a temperature of about 450° C., where it is maintained for about 4 hours. Then, the temperature is elevated at a temperature ramp of about 10° C./minute to 550° C., where it is maintained for about 8 hours. In yet another example, the organic material is removed by ion exchange using dilute HCl dissolved in ethanol.

Unlike particles that are a thin silica shell formed around a single large void (often formed by polymerizing a spherical silica shell around an oil droplet), such as those described by Schacht et al., a mesoporous inorganic oxide sphere produced by a method of the present invention is not hollow, but has a mesoporous region that continues throughout the interior of the particle.

Powder X-ray diffraction ("XRD") analysis of mesoporous inorganic oxide spheres of the present invention showed either one unusually broad peak with very low intensity or no diffraction at all, indicating a disordered product. In one example, XRD analysis provided the plot in FIG. 1. The plot in FIG. 1 shows an XRD pattern n the region between 1 and 8 degrees 2 θ for a sample of mesoporous inorganic oxide spheres produced according to the present invention. XRD analysis was performed on a Scintag X1θ-θ diffractometer equipped with a Peltier (solid-state thermoelectrically cooled) detector using Cu Kα radiation. X-ray radiation with a wavelength of 1.5456 Angstroms was emitted from a Cu target and fired at the sample. According to the Bragg equation (nλ=2d sin θ), coherent diffraction from regions of ordering in the sample with a repeat distance of d will occur at an angle θ. Thus, the observation of multiple peaks with narrow peak widths would be an indication of an ordered sample, and the locations within the sample of the regions creating the ordering could be estimated from the positions of the peaks. The presence of a single, very broad peak in the pattern of FIG. 1 indicates that although the sample may have some weak ordering, in general it is disordered. The pores within the sample have random locations relative to each other. Disordered product is most likely due to the $S^+X^+I^+$ method of self-assembly that occurs in acidic solution, in which interactions between a cationic surfactant and cationic silicate species are mediated by an anionic counterion. The interactions between the surfactant and silicate are therefore much weaker than in basic solution, where the silicate is anionic and interacts directly with the surfactant through electrostatic attraction ($S^+I^-$).

Mesoporous inorganic oxide spheres produced in accordance with the present invention have a high concentration of spherical particles and a remarkably narrow particle size distribution. Table 2 sets forth data of the high degree of spherical particles produced at various temperatures using a method of the present invention versus the degree of spherical particles produced at the same temperatures using a known method (a method set forth in U.S. Pat. No. 6,334,988 to Gallis et al.). In one example, at least about 90% of the particles produced in accordance with a method of the present invention were spherical. In another example, at least about 95% of the particles produced in accordance with a method of the present invention were spherical.

TABLE 2

| Tempera-ture ° C. | Examples of Mesoporous inorganic oxide spheres produced in accordance with the present invention | | Particles of U.S. Pat. No. 6,334,988 |
|---|---|---|---|
| | % Spheres | % interconnected | % Spheres |
| 25 | ~90 (0.5-1.5 um) | 50 | <50 |
| 50 | >90 (0.5-2 um) | 25 | ~50 |
| 70 | >95 (1-2.5 um) | 15 | >60 |
| 90 | >95 (1.5-3 um) | 10 | >80 |
| 100 | >95 (1.5-3 um) | 10 | >90 |
| 150 | >95 (1-3 um) | <10 | >90 |

Mesoporous inorganic oxide spheres produced in accordance with the present invention have a particle diameter that is advantageously small. In one example, the diameter of mesoporour inorganic oxide spheres produced by a method of the present invention range from about 0.1 μm to about 8 μm. In another example, the diameter of mesoporous inorganic oxide spheres produced by a method of the present invention range from about 1 μm to about 3 μm.

A mesoporous inorganic oxide sphere produced in accordance with the present invention has a large area. Larger surface area is particularly important in applications such as chromatography where the larger the surface area, the greater the enhancement of resolution between peakes. In one example, mesoporous inorganic oxide spheres produced in accordance with the present invention have a surface area from about 400 m$^2$/g to about 1200 m$^2$/g. In another example, mesoporous inorganic oxide spheres produced in accordance with the present invention have a surface area from about 800 m$^2$/g to about 1000 m$^2$/g. Surface areas of mesoporous inorganic oxide sphere produced in accordance with the present invention were measured using the BET technique described in the article by S. Brunauer et al. in the *Journal of the American Chemical Society,* 1938, volume 60, page 309, which is incorporated herein by reference in its entirety. N$_2$ adsorption and desorption isotherms were obtained on a Micromeritics ASAP 2010 instrument. Samples were degassed at 200° C. under vacuum overnight prior to measurement.

Figure 2:
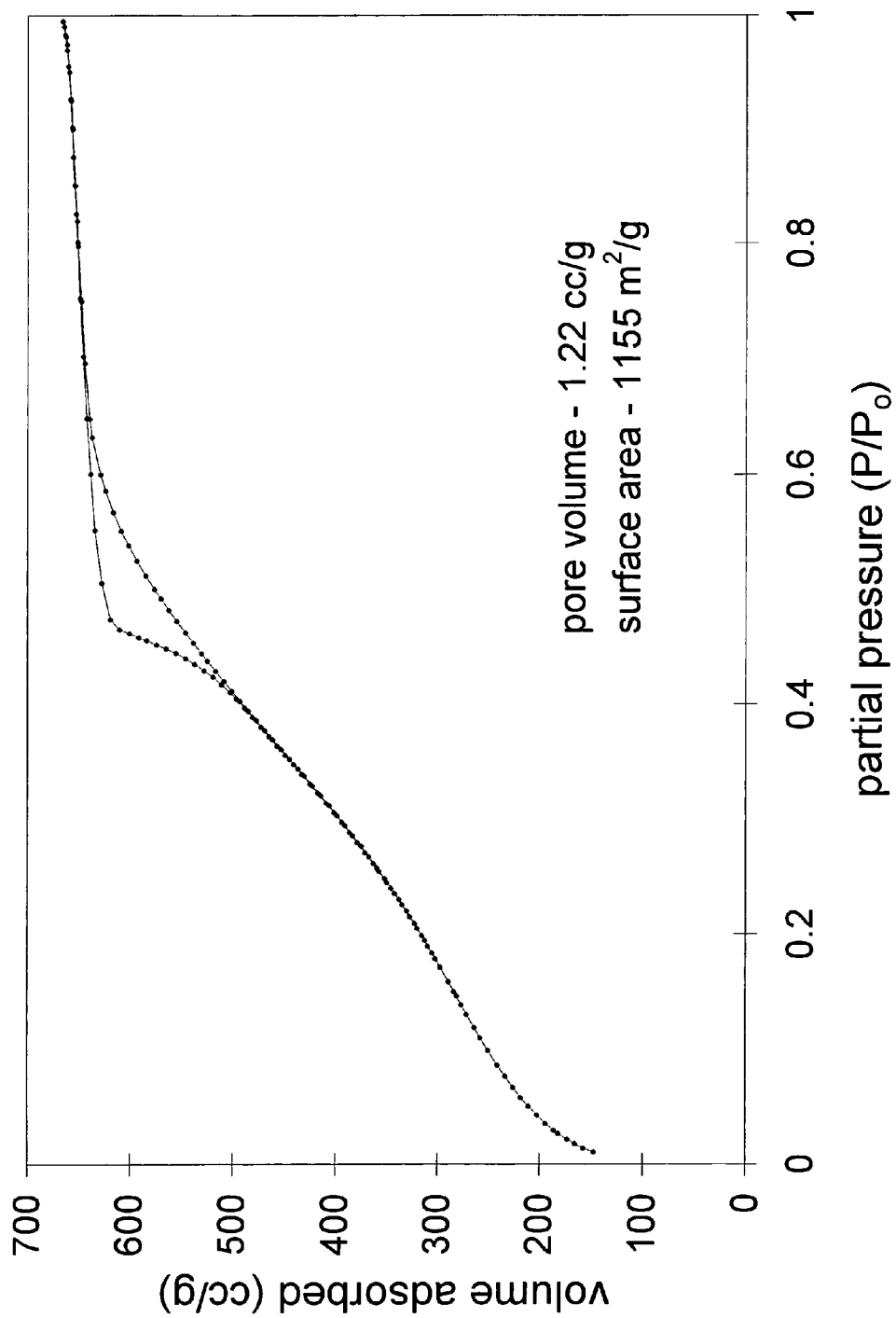
FIG. 2 shows a plot of a gas/adsorption/desorption isotherm for one example of mesoporous inorganic oxide spheres according to the present invention.

In one example, a sample of mesoporous inorganic oxide spheres produced in accordance with the present invention were placed in a high vacuum and nitrogen (N$_2$) was incrementally added to the sample chamber. A sensitive pressure transducer measured the volume relative to a standard held at a constant pressure, to account for environmental variations during the course of the experiment. FIG. 2 below shows a gas/adsorption/desorption isotherm for this example. The total surface of the area of the sample was calculated from this isotherm using the BET technique.

Mesoporous inorganic oxide spheres produced in accordance with the present invention have larger pore volumes than other known mesoporous inorganic oxide spheres. Larger pore volume is important because particles with large pore volumes have a higher permeability and a higher loading capacity than those with small pore volumes. For example, in size exclusion chromatography, it is desirable to use a column material with a large pore volume because the elution volume of the retained molecules, and therefore the separation between them, is increased. A chromatography column containing a material with a large pore volume has a large separating power. In one example, mesoporous inorganic oxide spheres produced in accordance with the present invention have a pore volume greater than about 0.65 cm$^3$/g. In another example, mesoporous inorganic oxide spheres produced in accordance with the present invention have a pore volume greater than about 0.75 cm$^3$/g. In yet another example, mesoporous inorganic oxide spheres produced in accordance with the present invention have a pore volume greater than about 0.85 cm$^3$/g.

In one embodiment, the mesoporous inorganic oxide spheres produced by a method of the present invention include a mesoporous spherical body. The mesoporous spherical body includes a plurality of pores. In one example, the plurality of pores has a pore volume greater than about 0.65 cm$^3$/g. In another example, the plurality of pores has a pore volume greater than about 0.75 cm$^3$/g. In yet another example, the plurality of pores has a pore volume greater than about 0.85 cm$^3$/g. In still another example, mesoporous inorganic oxide spheres produced in accordance with the present invention have a pore volume greater than 0.75 cm$^3$/g and an average pore diameter of greater than 37 Angstroms. In still yet another example, mesoporous inorganic oxide spheres produced in accordance with the present invention have a pore volume greater than about 1 cm$^3$/g and an average pore diameter of greater than about 50 Angstroms. In a further example, mesoporous inorganic oxide spheres produced in accordance with the present invention have a pore volume of greater than about 1.3 cm$^3$/g.

Figure 3:
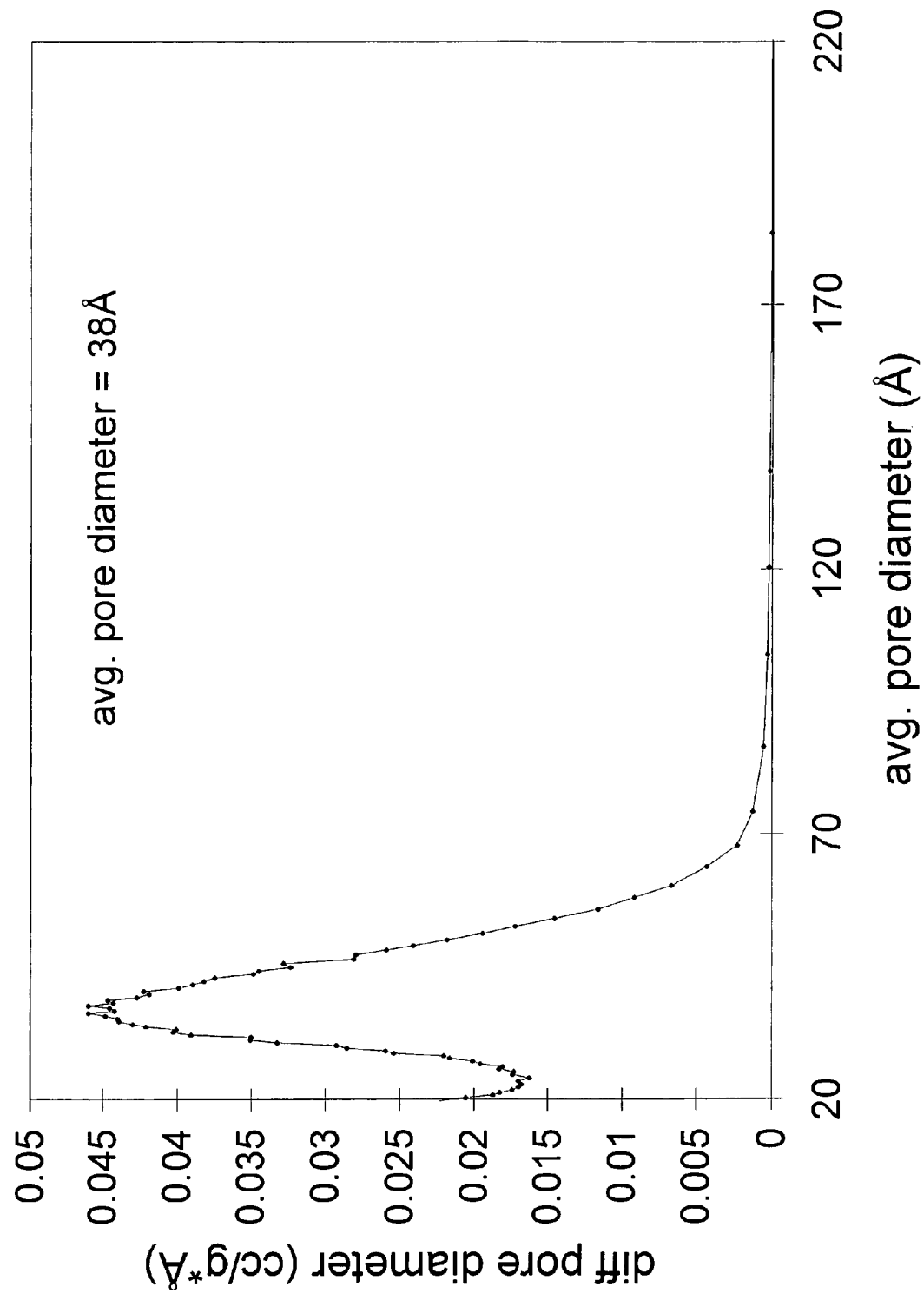
FIG. 3 shows a plot of pore diameter for one example of mesoporous inorganic oxide spheres according to the present invention.

In one example, using the gas adsorption/desorption isotherm from FIG. 2, the plot in FIG. 3 was produced. A series of pore diameter ranges was established from the isotherm and the portion of the N$_2$ absorbed due to the pores in each range was determined. A tabulation of pore volumes versus the average pore diameter in each range was created. A large adsorption at a particular average pore diameter implies that there must be a large number of pores with that diameter in the sample. The total pore volume and pore size distribution can be calculated from the plot in FIG. 3 using the method described by Barrett, Joyner, and Halenda (*J. Am. Chem. Soc.* 1951, 73, 373), which is incorporated herein by reference in its entirety. However, the data shown in FIG. 3 was calculated using an updated method that more accurately accounts for adsorption inside pores with diameters between 20 and 40 Angstroms. Such a method is set forth in an article by Kruk, M.; Jaroniec, M.; Sayari, A. in *Langmuir* 1997, 13, 6267, which is incorporated herein by reference in its entirety.

Mesoporous inorganic oxide spheres produced in accordance with the present invention can be used as the stationary phase in chromatographic separations. Examples of chromatographic techniques in which the mesoporous inorganic oxide spheres of the present invention are highly effective include, but are not limited to, conventional liquid chromatography ("LC"), normal phase flash liquid chromatography (FLC), high pressure liquid chromatography ("HPLC"), reverse phase FLC, and reverse phase HPLC. Use of pressure in FLC and HPLC alleviates the problem of backpressure often associated with the use of small particles in chromatography.

HPLC (high performance liquid chromatography) is a technique in which a solid material, usually silica, is packed into a stainless steel column. A liquid containing a mixture of dissolved chemicals that are to be separated is then pushed through the column under pressure. The chemicals have different levels of adsorption onto the silica, and so they travel through the column at different rates; chemicals that adsorb strongly to silica travel slowly, and those that adsorb weakly travel rapidly. This effectively separates one chemical from another. The type of liquid clearly also has an effect, since chemicals that are not very soluble in the liquid will also tend to travel slowly through the HPLC column. In a normal-phase HPLC separation, the silica is unmodified and is hydrophilic, and a hydrophobic liquid such as hexane is used. Peaks arise as a result of spectroscopic detection as they emerge from the column. The test separation shown above is frequently used to gauge the effectiveness of types of silica in HPLC.

To demonstrate the viability of mesoporous inorganic oxide spheres produced in accordance with the present invention for use as a stationary phase in chromatography, three HPLC stationary phases were compared for use in separation of benzene, naphthalene, and biphenyl. The three stationary phases used were 1) mesoporous inorganic oxide spheres produced in accordance with the present invention ("APMS2"), 2) inorganic oxide particles produced according to U.S. Pat. No. 6,334,988 ("APMS"), and 3) Nucleosil (a commercially available silica purchased from Phenomenex (advertised particle size 5 μm and pore size 50 Å). We have SEMs and our own porosity data for this Nucleosil material (surface area 369 m$^2$/g, pore volume 0.837 cm$^3$/g, Average pore diameter 116 Å, particle size 4-6 μm)).

HPLC separations were performed for the three different stationary phases using a Hewlett Packard series 1100 HPLC operating with a flow rate of 1 mL/min and an injection volume of 5 μL. A UV detector operating a 254 nm was used in the detection of all compounds. Stainless steel HPLC columns (50×4.6 mm, Phenomenex) were used for these separations. All materials were slurry packed (0.5-1 g of silica) into these columns with a 98.3% hexane and 1.7% dichloromethane solution under 5200 psi. Individual column conditions for the separations mobile phase 98.3:1.7 (Hexane: dichloromethane) for all of the columns, column temperature 30° C. for all of the columns, and Pressure for APMS 7 bar, APMS2 11 bar, and Nucleosil 10 bar.

Figure 4:
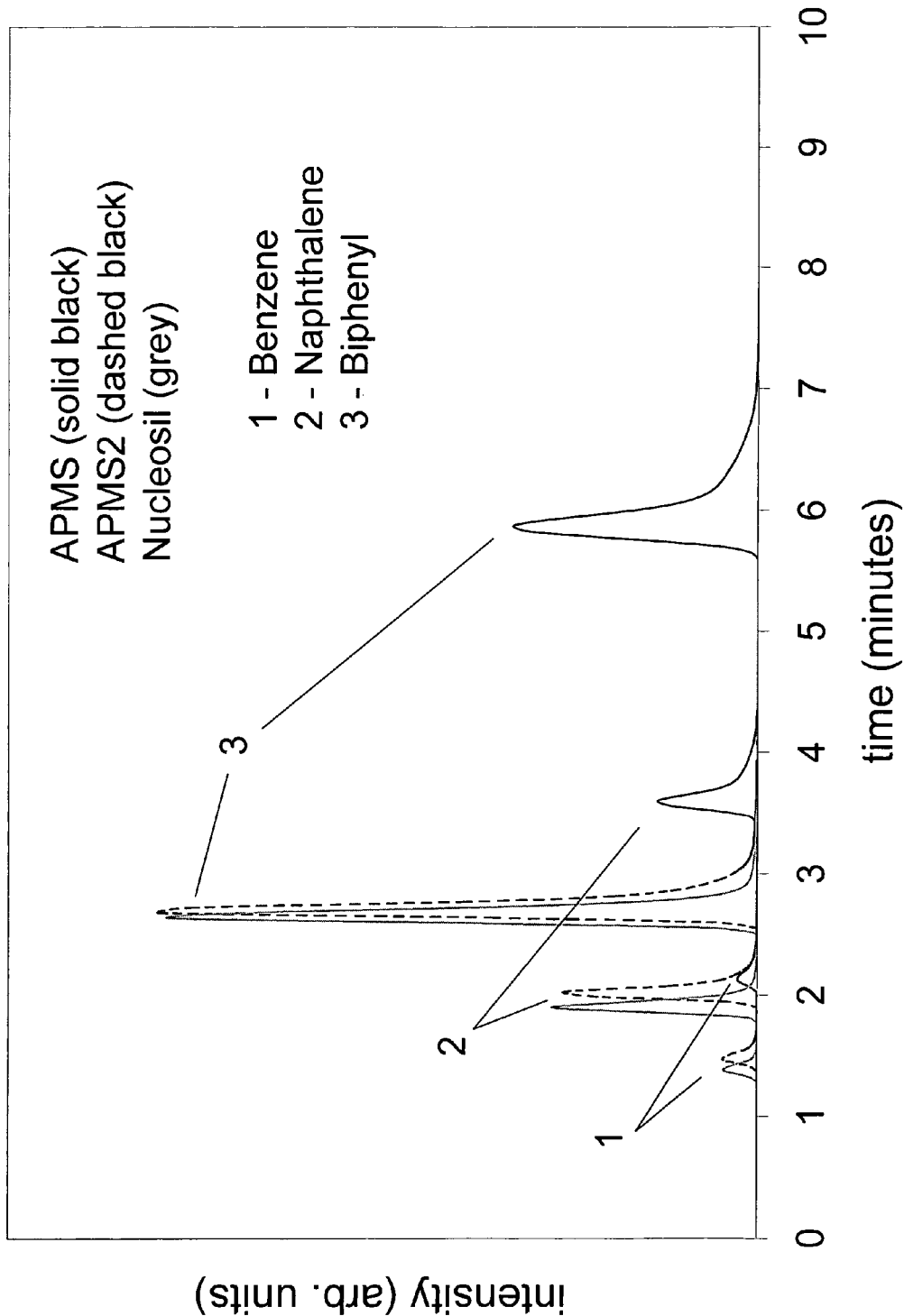
FIG. 4 shows a plot of chromatographs for each of three stationary phases, including a stationary phase comprising mesoporous inorganic oxide spheres according to the present invention.

FIG. 4 shows the resulting chromatographs for each of the three stationary phases. Table 3 shows information taken from each of the chromatographs.

TABLE 3

| peak | | APMS | APMS2 | Nucleosil |
|---|---|---|---|---|
| benzene (1) | $t_{R1}$ (minutes) | 2.13 | 1.47 | 1.38 |
| | $w_{1/2}$ (minutes) | 0.139 | 0.0927 | 0.0854 |
| | $k'_1$ | 1.82 | 0.863 | 0.756 |
| | N | 1290 | 1400 | 1460 |
| naphthalene (2) | $t_{R1}$ (minutes) | 3.59 | 2.02 | 1.90 |
| | $w_{1/2}$ (minutes) | 0.175 | 0.967 | 0.959 |
| | $k'_1$ | 3.77 | 1.56 | 1.41 |
| | N | 2330 | 2420 | 2170 |
| biphenyl (3) | $t_{R1}$ (minutes) | 5.86 | 2.68 | 2.65 |
| | $w_{1/2}$ (minutes) | 0.276 | 0.124 | 0.122 |
| | $k'_1$ | 10.3 | 4.28 | 4.27 |
| | N | 2500 | 2610 | 2630 |
| | $\alpha_{1-2}$ | 2.06 | 1.80 | 1.86 |
| | $\alpha_{1-3}$ | 5.65 | 4.96 | 5.65 |
| | $\alpha_{2-3}$ | 2.74 | 2.75 | 3.03 |

The retention time is indicated by $t_R$; $w_{1/2}$ is the width of the peak at half of its intensity; k' is the capacity factor of the column for the analyte, and N is the number of theoretical plates of the column when separating the compound (a measure of the separating ability of the column; larger N leads to greater separating effectiveness). α is a ratio of k' for one compound to k' for another. Ideally, one would observe narrow (small $w_{1/2}$), well separated peaks (large values of α), that elute as quickly as possible (small values of $t_R$), with large values of N. The above data shows that although APMS is pretty good at separating one compound from another, it can produce broad peaks with long retention times. APMS2, on the other hand, shows separation properties that are much closer to commercially used materials and are a distinct improvement over APMS.

In one embodiment of the present invention, a method of performing a liquid chromatographic separation of a liquid or dissolved solid compound is provided. The method includes packing a chromatography column with a slurry having a plurality of mesoporous inorganic oxide spherical particles made in accordance with the present invention. The slurry includes an organic solvent selected as a function of said liquid or dissolved solid compound to be separated. The method also includes adding the liquid or dissolved solid compound to the slurry; and retrieving a mobile phase of the liquid or dissolved solid compound from the chromatography column. The chromatography column can be a high pressure liquid chromatography column. In one example, the separation can include binding of an alkylsilane onto a mesoporous inorganic oxide spherical particle. by binding a chiral molecule onto said mesoporous inorganic oxide spherical particle. In another example, the separation can include adding a chiral molecule into said mobile phase during said separation.

FIGS. 5 to 11 show various data for multiple examples of mesoporous inorganic oxide spheres produced in accordance with the present invention. For each example, the mol % of each reaction mixture constituent is presented. Additionally, the time for visual indication of precipitation of spheres is given in seconds (sec.) for each example. The surface area in meters squared per gram ($m^2/g$), pore volume in cubic centimeters per gram (cc/g), pore diameter in Angstroms (Å), particle size in micrometers (μm), % of particles that are spherical, and % interconnection of particles are given for each example. The temperature and time of the mixing of the reaction mixture is indicated (the mixing was done at room temperature, "RT"). The temperature of heating is given in degrees Celsius (° C.) and the time of heating is indicated in minutes (min.).

FIG. 5 illustrates six examples with varying amounts of TEOS in a reaction mixture. FIG. 6 illustrates five examples with varying amounts of sodium fluoride in a reaction mixture. FIG. 7 illustrates seven examples with varying amounts of HCl in a reaction mixture. FIG. 8 illustrates six examples with varying amounts of ethanol in a reaction mixture. FIG. 9 illustrates five examples with varying amounts of CTAB in a reaction mixture. FIG. 10 illustrates six examples with varied heating temperatures. FIG. 11 illustrates six examples with varied time of heating.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A method of preparing mesoporous silicon oxide spherical particles, the method comprising:
   providing a reaction mixture that includes:
      a proton donor in an amount of about 1.39 mol % to about 1.76 mol %;
      a source of silicon oxide in an amount of about 0.017 mol % to about 1.6 mol %;
      a surfactant in an amount of about 0.01 mol % to about the limit of solubility;
      an alcohol in an amount of about 1.9 mol % to about 20 mol %;
      a source of fluoride in an amount of about 0.019 mol % to about 0.2 mol %; and
      water;
   mixing the reaction mixture sufficiently to form a precipitate in the reaction mixture;
   heating the reaction mixture containing the precipitate at a temperature in a range from about 50° C. to about 230° C. for not more than 120 minutes to produce mesostructured silicon oxide particles; and
   removing organic material from said mesostructured silicon oxide particles to form the mesoporous silicon oxide spherical particles having a pore volume of greater than about 0.65 $cm^3/g$ and being at least about 90% spherical.

2. The method of claim 1, wherein said source of silicon oxide is present in an amount from about 0.618 mol % to about 0.760 mol %.

3. The method of claim 2, wherein said source of silicon oxide is present in an amount of about 0.6 mol %.

4. The method of claim 1, wherein said source of fluoride is present in an amount from about 0.0720 mol % to about 0.0990 mol % mol %.

5. The method of claim 4, wherein said source of fluoride is present in an amount of about 0.08 mol %.

6. The method of claim 1, wherein said alcohol is present in an amount from about 3.96 mol % to about 13.5 mol %.

7. The method of claim 6, wherein said alcohol is present in an amount of about 4 mol %.

8. The method of claim 1, wherein said surfactant is present in an amount from about 0.115 mol % to about 0.253 mol %.

9. The method of claim 8, wherein said surfactant is present in an amount of about 0.16 mol %.

10. The method of claim 1, wherein said mixing step is performed until said reaction mixture is opaque.

11. The method of claim 1, wherein said proton donor is present in an amount of about 1.5 mol %.

12. The method of claim 1, wherein said proton donor comprises hydrochloric acid.

13. The method of claim 1, wherein said source of silicon oxide comprises a compound having a formula $Si(OR^1)(OR^2)(OR^3)(OR^4)$ where Si is silicon, O is oxygen, and $R^1$, $R^2$, $R^3$, and $R^4$ are alkyl chains having 1 to 4 carbon atoms.

14. The method of claim 1, wherein said source of silicon oxide comprises tetraethoxysilane.

15. The method of claim 1, wherein said source of fluoride comprises sodium fluoride.

16. The method of claim 1, wherein said alcohol comprises ethanol.

17. The method of claim 1, wherein said surfactant comprises a salt having a trialkylammonium cation and a halide anion.

18. The method of claim 1, wherein said surfactant comprises cetyltrimethylammonium bromide.

19. The method of claim 1, wherein said heating step is performed at a temperature from about 90° C. to 150° C.

20. The method of claim 1, wherein said heating step is performed at a temperature from about 70° C. to about 100° C.

21. The method of claim 1, wherein said heating step is performed for not more than 60 minutes.

22. The method of claim 1, wherein said removing step forms mesoporous silicon oxide spherical particles having a pore volume of greater than 0.75 $cm^3/g$.

23. The method of claim 1, wherein the water is in an amount of about 91.2 mol %.

* * * * *